United States Patent
Katusic et al.

(10) Patent No.: US 8,845,919 B2
(45) Date of Patent: Sep. 30, 2014

(54) IRON-SILICON OXIDE PARTICLES WITH A CORE-SHELL STRUCTURE

(75) Inventors: Stipan Katusic, Bad Soden (DE); Harald Herzog, Karlstein (DE); Peter Kress, Karlstein (DE); Armin Wiegand, Grosskrotzenburg (DE)

(73) Assignee: Evonik Degussa GmbH, Essen (DE)

( * ) Notice: Subject to any disclaimer, the term of this patent is extended or adjusted under 35 U.S.C. 154(b) by 697 days.

(21) Appl. No.: 13/126,179

(22) PCT Filed: Nov. 13, 2009

(86) PCT No.: PCT/EP2009/065157
§ 371 (c)(1),
(2), (4) Date: Apr. 27, 2011

(87) PCT Pub. No.: WO2010/063557
PCT Pub. Date: Jun. 10, 2010

(65) Prior Publication Data
US 2011/0207869 A1  Aug. 25, 2011

(30) Foreign Application Priority Data

Dec. 5, 2008  (DE) .......................... 10 2008 044 384

(51) Int. Cl.
| | | |
|---|---|---|
| C04B 35/00 | (2006.01) | |
| B32B 5/16 | (2006.01) | |
| C04B 35/628 | (2006.01) | |
| C09C 1/24 | (2006.01) | |
| C01G 49/00 | (2006.01) | |
| B82Y 30/00 | (2011.01) | |

(52) U.S. Cl.
CPC ... *C04B 35/62805* (2013.01); *C04B 2235/5409* (2013.01); *C09C 1/24* (2013.01); *C01G 49/00* (2013.01); *C01P 2006/12* (2013.01); *C01P 2004/04* (2013.01); *B82Y 30/00* (2013.01); *C04B 2235/3272* (2013.01); *C04B 35/62897* (2013.01); *C04B 35/62894* (2013.01); *C01P 2004/51* (2013.01); *C01P 2004/64* (2013.01)
USPC ...................... 252/62.59; 428/403; 252/62.56

(58) Field of Classification Search
USPC ............. 252/62.51 R, 62.56, 62.59; 428/402, 428/403, 404, 690; 542/442; 423/326; 427/215, 217, 219
See application file for complete search history.

(56) References Cited

U.S. PATENT DOCUMENTS

| | | |
|---|---|---|
| 2003/0059603 A1 | 3/2003 | Gottfried et al. |
| 2011/0006247 A1 | 1/2011 | Katusic et al. |
| 2011/0147641 A1 | 6/2011 | Meyer et al. |
| 2012/0080637 A1 | 4/2012 | Herzog et al. |
| 2012/0130023 A1 | 5/2012 | Herzog et al. |

FOREIGN PATENT DOCUMENTS

| | | |
|---|---|---|
| EP | 1284 485 | 2/2003 |
| EP | 2 000 439 | 12/2008 |
| JP | 10-81507 A | 3/1998 |
| JP | 2002-317202 A | 10/2002 |
| JP | 2008-282002 A | 11/2008 |
| WO | WO 2008148588 A1 * | 12/2008 |

OTHER PUBLICATIONS

Zachariah, M.R. et al., "Formation of Superparamagnetic Nanocomposites From Vapor Phase Condensation in a Flame", Nanostructured Materials, vol. 5, No. 4, pp. 383-392, (1995).*
"Surfactant Templating Effects on the Encapsulation of Iron Oxide Nanoparticles within Silica Microspheres", Zheng et al., Langmuir, American Chemical Society, published on the web Mar. 31, 2007, pp. 5143-5147.*
International Search Report issued Mar. 15, 2010 in PCT/EP09/65157 filed Nov. 13, 2009.
U.S. Appl. No. 13/989,981, filed May 28, 2013, Katusic, et al.

* cited by examiner

*Primary Examiner* — C Melissa Koslow
*Assistant Examiner* — Lynne Edmondson
(74) *Attorney, Agent, or Firm* — Oblon, Spivak, McClelland, Maier & Neustadt, L.L.P.

(57) ABSTRACT

Iron-silicon oxide particles with a core-shell structure, which have a) a BET-surface area of 10 to 80 $m^2/g$, b) a thickness of the shell of 2 to 30 nm and c) a content of iron oxide of 60 to 90% by weight, of silicon dioxide of 10 to 40% by weight, based in each case on the enveloped particles, where d) the proportion of iron, silicon and oxygen is at least 99% by weight, based on the enveloped particles, and where e) the core is crystalline and the iron oxides comprise haematite, magnetite and maghemite, f) the shell consists of amorphous silicon dioxide and g) at least one compound or a plurality of compounds consisting of the elements silicon, iron and oxygen is/are present between shell and core.

17 Claims, 1 Drawing Sheet

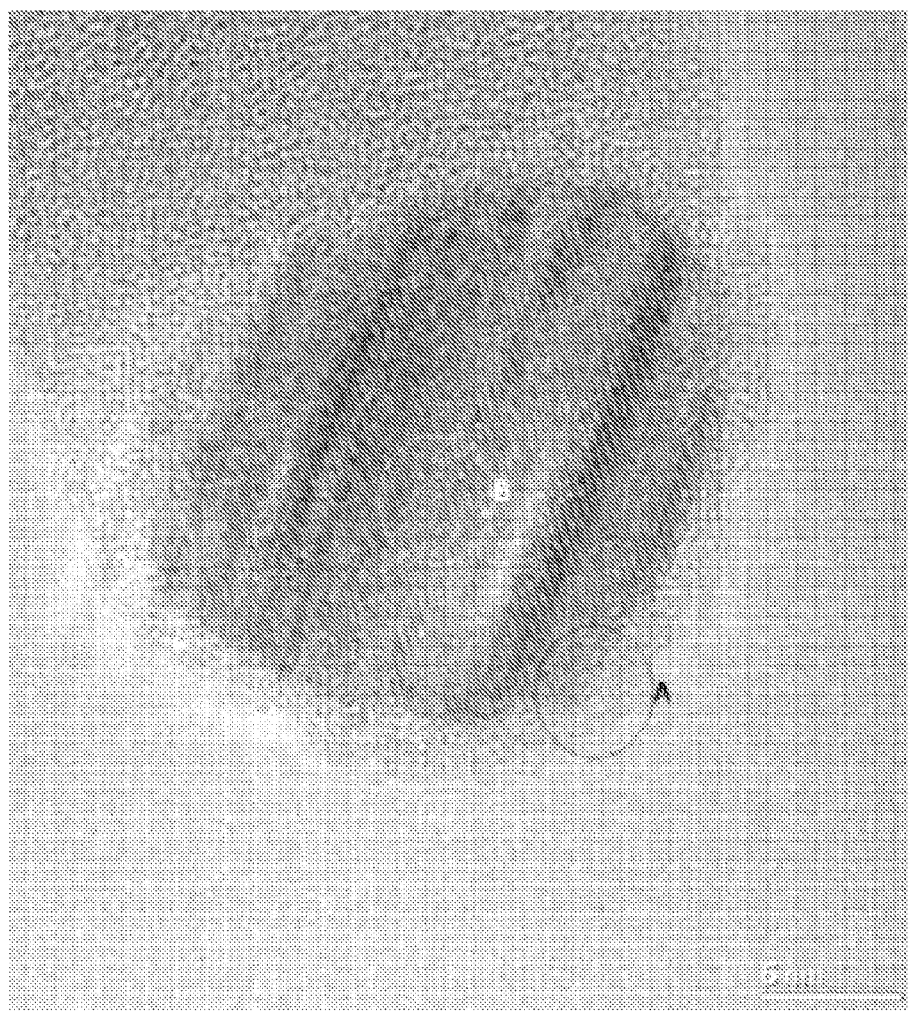

IRON-SILICON OXIDE PARTICLES WITH A CORE-SHELL STRUCTURE

CROSS REFERENCE TO RELATED APPLICATION

This application is a 371 of PCT/EP2009/065157, filed on Nov. 13, 2009, and claims priority to German Patent Application No. 10 2008 044 384.0, filed on Dec. 5, 2008.

The invention relates to iron-silicon oxide particles with a core-shell structure, and to the production and use thereof.

The inductive heating of bonds which comprise magnetic particles is described, for example, in WO03/042315. This describes, for example, the use of iron-silicon oxide particles obtained by flame pyrolysis for inductive heating of adhesive bonds. The particles and production thereof are disclosed in EP-A-1284485. The particles are pyrogenic particles which contain superparamagnetic iron oxide domains with a diameter of 3 to 20 nm in and on a silicon dioxide matrix. According to EP-A-1284485, the domains are understood to mean spatially separate superparamagnetic regions. In addition, magnetic domains which, owing to their size, do not exhibit superparamagnetism and induce remanent magnetization may also be present.

It has now been found that the heating rate in the course of inductive heating is still in need of improvement. Especially for inductive heating in a moderate frequency range, the particles disclosed in EP-A-1284485 are unsuitable. In addition, it has been found that the agglomeration tendency of the particles is in need of improvement.

It was therefore a technical object of the invention to provide particles which reduce the heating rate in the course of inductive heating compared to the prior art. It was a further technical object to provide particles which at the same time have a significantly reduced agglomeration tendency compared to the prior art.

The invention provides iron-silicon oxide particles with a core-shell structure, which have
a) a BET-surface area of 10 to 80 $m^2/g$,
b) a thickness of the shell of 2 to 30 nm and
c) a content of iron oxide of 60 to 90% by weight, of silicon dioxide of 10 to 40% by weight,
based in each case on the enveloped particles, where
d) the proportion of iron, silicon and oxygen is at least 99% by weight, based on the enveloped particles, and where
e) the core is crystalline and the iron oxides comprise
   haematite,
   magnetite and
   maghemite,
f) the shell consists of amorphous silicon dioxide and
g) at least one compound or a plurality of compounds consisting of the elements silicon, iron and oxygen is/are present between shell and core.

In a particular embodiment of the invention, the BET surface area of the particles is a BET surface area of 30 to 70 and preferably 40 to 60 $m^2/g$.

In a further particular embodiment of the invention, the thickness of the shell is 5 to 20 nm.

In a further particular embodiment of the invention, the content of iron oxide is 75 to 85% by weight and that of silicon dioxide 15 to 25% by weight, based in each case on the enveloped particles.

The inventive particles preferably have a mean particle diameter of 5 to 100 nm and more preferably of 30 to 80 nm. The 90% range of the numerical distribution of the inventive particles is preferably 5 to 60 nm.

The inventive particles have magnetic properties. They may be ferrimagnetic, ferromagnetic and/or superparamagnetic. Preference may be given to inventive particles with superparamagnetic properties. Superparamagnetic substances do not have a permanent (coincident) arrangement of the elementary magnetic dipoles in the absence of external, active magnetic fields. They may have a low residual magnetization.

In addition, the inventive particles are very substantially pore-free and have free hydroxyl groups on the surface.

In a preferred embodiment of the invention, the particles are present predominantly or exclusively as aggregated iron oxide particles enveloped by silicon dioxide. It is possible that a few non-aggregated individual particles are present.

The bond between shell and core may predominantly or exclusively comprise iron silicate. The bond is generally present at 0.1 to 3% by weight, based on the enveloped particles.

The core of the inventive particles comprises the iron oxides haematite, magnetite and maghemite. In general, other iron oxide polymorphs cannot be detected. In individual cases, small amounts of beta-$Fe_2O_3$ can be detected.

In a particular embodiment of the invention, the proportion of haematite determined from the X-ray diffractograms is 1 to 10% by weight, preferably 4 to 8% by weight, that of magnetite 20 to 50% by weight, preferably 35 to 40% by weight, and that of maghemite 40 to 75% by weight, preferably 50 to 60% by weight, where the proportions add up to 100% by weight.

Inventive particles which have this distribution are suitable particularly for inductive heating in a medium-frequency magnetic field of 3-100 kHz, preferably 20 to 60 kHz.

In a further particular embodiment of the invention, the proportion of haematite determined from the X-ray diffractograms is 5 to 40% by weight, preferably 10 to 30% by weight, that of magnetite 50 to 90% by weight, preferably 60 to 85% by weight, and that of maghemite 5 to 30% by weight, preferably 10 to 20% by weight, where the proportions add up to 100%.

Inventive particles which have this distribution are particularly suitable for inductive heating in a high-frequency magnetic field of more than 100 kHz, preferably 400 to 1000 kHz.

The iron oxide polymorphs present in the core are crystalline and have, in a preferred embodiment of the invention, a crystal size of the haematite of 200 to 1200 ångström, of the magnetite of 200 to 600 ångström and of the maghemite of 150 to 500 ångström, calculated in each case from the X-ray diffractogram according to Debye-Scherrer.

For inductive heating in a medium-frequency magnetic field, very particular preference is given to inventive particles for which
   a) the BET surface area is 40 to 70 $m^2/g$,
   b) the thickness of the shell is 5 to 20 nm,
   c) the content of iron oxide is 80 to 90% by weight and that of silicon dioxide 10 to 20% by weight, based in each case on the enveloped particles, and where
   d) the core contains
      d1) 1 to 10% haematite with a crystal size of 700 to 1100 ångström,
      d2) 20 to 50% magnetite with a crystal size of 400 to 700 ångström,
      d3) 40 to 75% maghemite with a crystal size of 100 to 500 ångström,
   where the sum of these constituents is normalized to 100% and the crystal sizes are calculated from the X-ray diffractogram according to Debye-Scherrer,
   e) the bond between core and shell is iron silicate.

For inductive heating in a high-frequency magnetic field, very particular preference is given to inventive particles for which a) the BET surface area is 40 to 70 m$^2$/g,
b) the thickness of the shell is 5 to 20 nm,
c) the content of iron oxide is 80 to 90% by weight and that of silicon dioxide 10 to 20% by weight, based in each case on the enveloped particles, and where
d) the core contains
  d1) 15 to 40% haematite with a crystal size of 200 to 400 ångström,
  d2) 50 to 70% magnetite with a crystal size of 150 to 400 ångström,
  d3) 5 to 30% maghemite with a crystal size of 150 to 250 ångström,
  where the sum of these constituents is normalized to 100% and the crystal sizes are calculated from the X-ray diffractogram according to Debye-Scherrer,
e) the bond between core and shell is iron silicate.

The invention further provides a process for producing the inventive iron-silicon oxide particles with a core-shell structure, in which a1) a stream comprising 10 to 40% by weight, calculated as $SiO_2$, of two or more vaporous, hydrolysable and/or oxidizable silicon compounds, one of which is a monosilane and the proportion of the monosilane is 5 to 50 mol %, based on the sum of the silicon compounds, and
a2) a stream, in vaporous form or in the form of an aerosol, comprising 60 to 90% by weight of an oxidizable and/or hydrolysable iron compound, calculated as $Fe_2O_3$, are combined to a mixture in the mixing zone of a reactor comprising, in succession, a mixing zone, combustion zone, cooling zone and solids removable zone, b) the mixture, one or more hydrogenous combustion gases and an oxygen-containing gas are transferred into the combustion zone separately from one another, ignited there and allowed to react to completion at adiabatic temperatures of 700 to 2500° C., preferably 1000 to 1500° C., more preferably 1100 to 1400° C. and a mean residence time of 10 ms to 10 s, preferably 20 ms to 1 s, more preferably 30 to 100 ms.
c) the reaction mixture is subsequently cooled to temperatures of 200 to 400° C. by feeding water into the cooling zone and, subsequently,
d) the solids are removed from gaseous or vaporous substances in the removal zone.

Suitable silicon compounds, in addition to the monosilane, are especially chlorosilanes and purely organic silicon compounds. Suitable chlorosilanes are, for example, $SiCl_4$, $CH_3SiCl_3$, $(CH_3)_2SiCl_2$, $(CH_3)_3SiCl$, $HSiCl_3$, $(CH_3)_2HSiCl$ and $CH_3C_2H_5SiCl_2$, and also mixtures of the aforementioned chlorosilanes. In addition, it is possible to use, for example, $Si(OC_2H_5)_4$, $Si(OCH_3)_4$, and the cyclic siloxanes of the general formula $[SiR^1R^2O]_n$, where $R^1$, $R^2$, $R^3$=Me or Et, n=3 to 7, where $R^1$, $R^2$ are independent of one another. More preferably, $SiCl_4$ can be used.

The proportion of monosilane as an essential component is preferably 5 to 30 mol %, based on the sum of the silicon compounds used. It is possible to introduce a portion thereof directly into the combustion zone instead of to the mixing zone.

A particularly useful iron compound has been found to be iron(II) chloride. In addition, it is also possible to use organoiron compounds, such as iron pentacarbonyl.

The iron compound can be used either in vaporous form or in the form of an aerosol obtained by atomizing a solution of an iron compound by means of an inert gas or of an oxygen-containing gas. The introduction of the iron compound via an aerosol is preferred. The aerosol can be formed, for example, with a multisubstance nozzle, an ultrasound generator or an electrostatic spray apparatus. The concentration of the iron compound in the solution is preferably 10 to 40% by weight, based on the solution. The atomization is effected, for example, by means of an inert gas or of an oxygen-containing gas.

It may be advantageous to subject the aerosol to a thermal treatment before it is introduced into the mixing zone. This can be done, for example, in an oven zone at temperatures of 50 to 100° C. above the boiling point of the solvent for a residence time of 2 to 20 seconds. It has been found that a powder produced by means of this process has a particularly high heating rate in a magnetic alternating field.

Suitable combustion gases may be hydrogen, methane, ethane, propane, natural gas, acetylene or mixtures of the aforementioned gases. Hydrogen is the most suitable. Preference is given to using hydrogen or mixtures with hydrogen.

The invention further provides for the use of the inventive iron-silicon oxide particles with a core-shell structure as a constituent of rubber mixtures, as a constituent of polymer formulations, as a constituent of adhesive compositions, as a constituent of bonded polymer mouldings obtainable by welding in an electromagnetic alternating field, and for producing dispersions.

EXAMPLES

Example 1

A stream of a vaporous mixture of 0.49 kg/h of $SiCl_4$ and 0.05 kg/h of monosilane, and a second stream in the form of an aerosol obtained from a 25 percent by weight solution of iron(II) chloride, corresponding to 1.55 kg/h of iron(II) chloride, in water, and 5 m$^3$ (STP)/h of nitrogen as an atomizing gas at room temperature (23° C.) by means of a two-substance nozzle, are introduced separately into the mixing zone of a reactor.

This mixture is reacted in the combustion zone of the reactor in a flame generated by igniting a mixture of 7.9 m$^3$ (STP)/h of hydrogen and 21 m$^3$ (STP)/h of air. The residence time of the reaction mixture in the combustion zone is approx. 40 ms.

In the cooling zone which follows downstream of the combustion zone, the reaction mixture is cooled to 332° C. by introducing 8 kg/h of water.

The resulting solid is separated from the gaseous substances on a filter.

Example 2

Is performed analogously to Example 1, except that the aerosol is introduced into the mixing zone by means of external heating to a temperature of 80° C. on entry.

Examples 3 to 5

Are performed analogously to Example 1, except that the proportions of silicon tetrachloride, monosilane, hydrogen and air are altered.

Example 6

Is a comparative example in which no monosilane is used.

The reaction parameters of Examples 1 to 6 are reproduced in Table 1.

The physical chemical values of the powders obtained are reproduced in Table 2.

The powders from Examples 1 and 2 are notable for a particularly high heating rate in the medium-frequency range.

The powder from Example 3 exhibits a comparable composition with regard to core and shell and a comparable BET surface area to the powders from Examples 1 and 2. However, the core has a different composition and different crystal sizes. Compared to the powders from Examples 1 and 2, the heating rate in the medium-frequency range is lower, but good heating rates are registered in the high-frequency range.

The powders of Examples 4 and 5 have a higher BET surface area compared to Example 1. In addition, the proportion of magnetite in the core predominates. The heating rates are comparable to those of Example 3.

The powder from comparative Example 6 has a composition comparable to Examples 1 and 2 with regard to silicon dioxide and iron oxide. Unlike the powders from Examples 1 and 2, however, it does not have a core-shell structure. Instead, there are regions of iron oxide and silicon dioxide alongside one another. The heating rate of the powder in the medium- and high-frequency range is significantly lower than for the inventive powders of Examples 1 and 2.

FIG. 1 shows a high-resolution TEM image of an inventive iron-silicon oxide particle from Example 1. The core-shell structure is clearly evident. The two regions indicated by A (shell) and B (core) were analysed by EDX (energy-dispersive analysis of characteristic X-rays). A determination of the lattice spacings in the high-resolution TEM spectra of inventive iron-silicon oxide particles shows clearly that the core consists of iron oxide. The shell consists of amorphous silicon dioxide. Between core and shell, it is possible to detect regions which have both iron and silicon. The iron-silicate structure is assigned to these regions in conjunction with the X-ray diffractogram.

TABLE 2

Physicochemical data of the powders

| Example | | 1 | 2 | 3 | 4 | 5 | 6[1] |
|---|---|---|---|---|---|---|---|
| BET surface area | $m^2/g$ | 40 | 38 | 33 | 60 | 74 | 53 |
| Mean particle diameter | nm | 11 | 14 | 25 | 16 | 13 | 17 |
| 90% range of the numerical distribution | nm | 5-20 | 6-21 | 11-40 | 8-24 | 4-28 | n.d. |
| Thickness of the shell | nm | 2-15 | 2-20 | 5-30 | 3-8 | 3-6 | — |
| Silicon dioxide | % by wt. | 17.4 | 17.4 | 21.6 | 19.3 | 36.5 | 15.2 |
| Iron oxide | % by wt. | 82.6 | 82.6 | 78.4 | 81.7 | 63.5 | 84.8 |
| maghemite | % by wt. | 57 | 69 | 13 | 7 | 5 | 16 |
| magnetite | % by wt. | 38 | 26 | 65 | 85 | 74 | 33 |
| haematite | % by wt. | 5 | 5 | 22 | 7 | 17 | 51 |
| Crystal size[2] | | | | | | | |
| maghemite | Å | 325 | 400 | 170 | —[7] | —[7] | —[7] |
| magnetite | Å | 525 | 579 | 325 | 325 | 170 | 180 |
| haematite | Å | 870 | 1050 | 275 | 375 | 260 | — |
| $T_{max}$[3] | | | | | | | |
| 30 MHz, 0.75 KW[4],[6] | °C. | 303 | 347 | 193 | 134 | 153 | 83 |
| 50 MHz, 0.75 KW[4],[6] | °C. | — | — | 218 | 152 | 191 | 99 |
| 655 MHz, 2.9 KW[5],[6] | °C. | — | — | 375 | 293 | 327 | 202 |

[1]Comparative example;
[2]Magnetite, haematite ±5%; maghemite ±10%;
[3]Maximum temperature attained in the course of heating in a magnetic alternating field of the frequency specified for a duration of 7.5 s for 30 and 50 MHz, or 2 s at 655 MHz;
[4]Determined by means of IFF EW10W;
[5]Determined by means of Celes GCTM25
[6]Sample preparation: 100% dry powder in glass Petri dish; glass thickness 1.8 mm; powder height 1.5 ± 0.1 mm; pyrometer measurement on the surface, epsilon 95%;
[7]Crystal sizes not determinable owing to the small proportion of maghemite.

TABLE 1

Reaction parameters

| Example | | 1 | 2 | 3 | 4 | 5 | 6[1] |
|---|---|---|---|---|---|---|---|
| $SiCl_4$ | kg/h | 0.17 | 0.17 | 0.49 | 0.62 | 0.87 | 0.87 |
| $SiH_4$ | kg/h | 0.01 | 0.01 | 0.05 | 0.02 | 0.01 | 0 |
| Hydrogen | $m^3$ (STP)/h | 4.8 | 4.8 | 7.9 | 7.9 | 6.8 | 7.0 |
| Air | $m^3$ (STP)/h | 12.5 | 12.5 | 21 | 21 | 21 | 18 |
| Aerosol | | | | | | | |
| Conc. $FeCl_2$ solution. | % by wt. | 25 | 25 | 25 | 25 | 25 | 25 |
| $FeCl_2$ | kg/h | 0.6 | 0.6 | 1.55 | 1.85 | 0.6 | 2.75 |
| Nitrogen | $m^3$ (STP)/h | 3 | 3 | 5 | 5 | 3 | 4 |
| T(aerosol)[2] | °C. | 23 | 180 | 23 | 23 | 23 | 23 |
| Adiabatic temp. | °C. | 1150 | 1300 | 1200 | 1250 | 1200 | 1300 |
| Residence time[3] | ms | 60 | 60 | 47 | 43 | 52 | 40 |
| Cooling water | kg/h | 7 | 8 | 8 | 7 | 7 | 8 |
| Temperature[4] | °C. | 332 | 325 | 327 | 337 | 341 | 221 |

[1]Comparative example;
[2]on entry into mixing zone;
[3]in combustion zone;
[4]after cooling;

The invention claimed is:

1. A process for producing an iron-silicon oxide particle, comprising:
   combining
   (a1) a first stream comprising 10 to 40% by weight, calculated as $SiO_2$, of two or more silicon compounds which are at least one of vaporous, hydrolyzable and oxidizable, wherein one of the silicon compounds is a monosilane and a proportion of the monosilane is 5 to 50 mol %, based on a sum of the silicon compounds, and
   (a2) a second stream, in vaporous form or in aerosol form, comprising 60 to 90% by weight of an iron compound, which is at least one of oxidizable and hydrolyzable, calculated as $Fe_2O_3$,
   to obtain a mixture in a mixing zone of a reactor comprising, in succession, a mixing zone, combustion zone, cooling zone, and solids removal zone;
   b) transferring the mixture, at least one hydrogenous combustion gas, and an oxygen-comprising gas into the combustion zone separately from one another, and igniting them in the combustion zone, and allowing them to react to completion at an adiabatic temperature of 700 to 2500° C. and a mean residence time of 10 ms to 10 s, to obtain a reaction mixture;
   c) cooling the reaction mixture to a temperature of 200 to 400° C. by feeding water into the cooling zone; subsequently,
   d) removing at least one solid from gaseous or vaporous substances in the solids removal zone; and
   thermally treating the iron compound, which is in aerosol form, before introducing the iron compound into the mixing zone, thereby producing an iron-silicon oxide having:
   (a) a core-shell structure, comprising a shell and an enveloped particle comprising a core;
   (b) a BET-surface area of 10 to 80 $m^2/g$;
   (c) a thickness of the shell of 2 to 30 nm;
   (d) a content of iron oxide of 60 to 90% by weight; and
   (e) a content of silicon dioxide of 10 to 40% by weight, based in each case on the enveloped particle,
   wherein:
   a proportion of iron, silicon, and oxygen is at least 99% by weight, based on the enveloped particle,
   the core is crystalline, comprising iron oxides, and the iron oxides comprise haematite, magnetite, and maghemite,
   the shell consists of amorphous silicon dioxide, and
   at least one compound consisting of the elements silicon, iron, and oxygen is present between shell and core.

2. The process of claim 1, wherein a bond between the shell and core is iron silicate.

3. The process of claim 1, wherein a proportion of
   haematite is 1 to 10% by weight
   magnetite is 20 to 50% by weight, and
   maghemite is 40 to 75% by weight, and
   the proportions add up to 100% by weight.

4. The process of claim 1, wherein a proportion of
   haematite is 5 to 40% by weight,
   magnetite is 50 to 90% by weight, and
   maghemite is 5 to 30% by weight, and
   the proportions add up to 100%.

5. The process of claim 1, wherein a crystal size of the
   haematite is 200 to 1200 ångström,
   magnetite is 200 to 600 ångström, and
   maghemite is 150 to 500 ångström,
   calculated from an X-ray diffractogram according to Debye-Scherrer.

6. The process of claim 1, wherein the iron silicon oxide particle is present in the form of aggregates of iron oxides enveloped by silicon dioxide.

7. The process of claim 1, wherein one of the silicon compounds is a halogenated silicon compound.

8. The process of claim 1, wherein a proportion of monosilane is 5 to 30 mol % based on the silicon compounds present in the first stream.

9. The process of claim 1, wherein the iron compound is iron(II) chloride.

10. The process of claim 1, wherein the iron compound is in the aerosol form, obtained by atomizing a solution of the iron compound with an inert gas or an oxygen-comprising gas.

11. The process of claim 6, wherein a bond between the shell and core is iron silicate.

12. The process of claim 6, wherein a proportion of
    haematite is 1 to 10% by weight,
    magnetite is 20 to 50% by weight, and
    maghemite is 40 to 75% by weight, and
    the proportions add up to 100% by weight.

13. The process of claim 2, wherein a proportion of
    haematite is 1 to 10% by weight,
    magnetite is 20 to 50% by weight, and
    maghemite is 40 to 75% by weight, and
    the proportions add up to 100% by weight.

14. The process of claim 6, wherein a proportion of
    haematite is 5 to 40% by weight,
    magnetite is 50 to 90% by weight, and
    maghemite is 5 to 30% by weight, and
    the proportions add up to 100%.

15. The process of claim 2, wherein a proportion of
    haematite is 5 to 40% by weight,
    magnetite is 50 to 90% by weight, and
    maghemite is 5 to 30% by weight, and
    the proportions add up to 100%.

16. The process of claim 6, wherein a crystal size of the
    haematite is 200 to 1200 ångström,
    magnetite is 200 to 600 ångström, and
    maghemite is 150 to 500 ångström,
    calculated from an X-ray diffractogram according to Debye-Scherrer.

17. The process of claim 2, wherein a crystal size of the
    haematite is 200 to 1200 ångström,
    magnetite is 200 to 600 ångström, and
    maghemite is 150 to 500 ångström,
    calculated from an X-ray diffractogram according to Debye-Scherrer.

* * * * *